United States Patent
Yue et al.

(10) Patent No.: US 10,114,256 B2
(45) Date of Patent: Oct. 30, 2018

(54) ARRAY SUBSTRATE AND LIQUID CRYSTAL DISPLAY PANEL

(71) Applicants: Xiamen Tianma Micro-Electronics Co., Ltd., Xiamen (CN); Tianma Micro-Electronics Co., Ltd., Shenzhen (CN)

(72) Inventors: Qin Yue, Xiamen (CN); Rong Chen, Xiamen (CN); Boping Shen, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 14/737,433

(22) Filed: Jun. 11, 2015

(65) Prior Publication Data
US 2016/0187746 A1    Jun. 30, 2016

(30) Foreign Application Priority Data
Dec. 29, 2014 (CN) .......................... 2014 1 0837661

(51) Int. Cl.
G02F 1/1343 (2006.01)
G02F 1/1337 (2006.01)
G02F 1/1362 (2006.01)

(52) U.S. Cl.
CPC ...... *G02F 1/134363* (2013.01); *G02F 1/1337* (2013.01); *G02F 1/136286* (2013.01)

(58) Field of Classification Search
CPC ............. G02F 1/134363; G02F 1/1337; G02F 1/136286
See application file for complete search history.

(56) References Cited

U.S. PATENT DOCUMENTS

2004/0263748 A1* 12/2004 Park ................. G02F 1/134363
                                                                349/141
2007/0152939 A1*  7/2007 Kim ................. G02F 1/134363
                                                                 345/94
(Continued)

FOREIGN PATENT DOCUMENTS

CN         101122723 A      2/2008
CN         101299107 A     11/2008
(Continued)

OTHER PUBLICATIONS

Chinese Application No. 201410837661.X, First Office Action dated Dec. 28, 2016.

*Primary Examiner* — Sang V Nguyen
(74) *Attorney, Agent, or Firm* — Alston & Bird LLP

(57) ABSTRACT

An array substrate and a liquid crystal display panel are described. The array substrate includes: pixel electrodes and common electrodes, where each of the pixel electrodes and/or the common electrodes includes one or more straight-line portions located in multiple pixel regions defined by the intersection of the scanning lines and the data lines. The straight-line portions in two pixel regions adjacent to each other in an extension direction of the data line are symmetric about an extension direction of the scanning line. The array substrate also includes an alignment layer having an alignment direction substantially perpendicular to the extension direction of the scanning line, and an angle between an extension direction of the straight line portion and the alignment direction of the alignment layer is greater than or equal to 4 degrees and less than or equal to 6 degrees.

14 Claims, 10 Drawing Sheets

(56) References Cited

U.S. PATENT DOCUMENTS

| | | | |
|---|---|---|---|
| 2008/0036930 A1 | 2/2008 | Konno et al. | |
| 2008/0246912 A1* | 10/2008 | Inoue | C09K 19/3003 349/182 |
| 2010/0039598 A1* | 2/2010 | Chang | G02F 1/133555 349/139 |
| 2010/0321283 A1* | 12/2010 | Mizuno | G02F 1/136227 345/88 |
| 2012/0320320 A1* | 12/2012 | Chen | G02F 1/133707 349/106 |
| 2013/0033665 A1 | 2/2013 | Chung et al. | |
| 2013/0033666 A1* | 2/2013 | Chung | G02F 1/133707 349/126 |
| 2013/0088668 A1* | 4/2013 | Seo | G02F 1/133784 349/96 |
| 2013/0100388 A1 | 4/2013 | Matsushima | |
| 2013/0256669 A1* | 10/2013 | Jang | G02F 1/136286 257/59 |

FOREIGN PATENT DOCUMENTS

| | | |
|---|---|---|
| CN | 102253553 A | 11/2011 |
| CN | 102629045 A | 8/2012 |
| CN | 103076697 A | 5/2013 |
| CN | 103365011 A | 10/2013 |
| CN | 204302633 U | 4/2015 |
| KR | 20010003751 A | 1/2001 |

\* cited by examiner

ARRAY SUBSTRATE AND LIQUID CRYSTAL DISPLAY PANEL

CROSS-REFERENCES TO RELATED APPLICATIONS

This application claims the benefit of priority to Chinese Patent Application No. 201410837661.X, filed with the Chinese Patent Office on Dec. 29, 2014 and entitled "ARRAY SUBSTRATE AND LIQUID CRYSTAL DISPLAY PANEL", the content of which is incorporated herein by reference in its entirety.

FIELD OF THE INVENTION

The disclosure relates to display technology, and in particular to an array substrate and a liquid crystal display panel including the array substrate.

BACKGROUND OF THE INVENTION

A flat panel displays is widely used due to its characteristics such as lightweight, slim configuration, and low power consumption. A liquid crystal display is a common flat panel display. A liquid crystal display panel generally includes an array substrate, a color film substrate and a liquid crystal layer disposed between the array substrate and the color film substrate. At least one of the array substrate and the color film substrate is provided with pixel electrodes and common electrodes, voltages are applied to the pixel electrodes and the common electrodes to form an electric field, and an alignment angle of liquid crystal molecules is adjusted by controlling the strength of the electric field, to change light transmittance of a backlight.

In view of the operating mode of liquid crystal molecules of the liquid crystal display panel, there are mainly two types of liquid crystal display panel, i.e., a longitudinal electric field type and a transverse electric field type. For the liquid crystal display panel of the longitudinal electric field type, the liquid crystal layer is driven by an electric field substantially perpendicular to the plane where the substrate locates, to modulate light entering the liquid crystal layer to display an image. Examples of this display mode include a twisted nematic (TN) mode and a multi-domain vertical alignment (MVA) mode. For the liquid crystal display panel of the transverse electric field type, the liquid crystal layer is driven by using an electric field substantially parallel to the plane where the substrate locates, to modulate light entering the liquid crystal layer to display an image. Examples of this display mode include an in-plane switching (IPS) mode and a fringe field switching (FFS) mode.

The liquid crystal display panel of the transverse electric field type is increasingly widespread in practical applications in view of its characteristics such as small color deviation viewed from various directions, good color restoration, fast response speed, high contrast and wide viewing angle. In practice, to further improve gray scale inversion and color deviation in a large viewing angle, a structure of double-domain or pseudo double-domain is adopted. That is, in one pixel or two pixels adjacent to each other in an extension direction of a data line, the pixel electrodes or the common electrodes include strip-type electrodes extending along two directions, so that in any one row or two adjacent rows of pixels, gray scale and transmittance for sub-pixels of any one color in different viewing angles have a combined effect obtained by compensation between two regions or two pixels provided with the strip-type electrodes inclining in different directions, thus color deviation and gray scale inversion are improved.

In the case that the structure of a pseudo double-domain is adopted, in spite of the improvements of color deviation and gray scale inversion, there are always angle deviation during a process of alignment in preparing an alignment layer of the array substrate and a process of adhering a polarizer of the display panel, thereby causing a small discrepancy between transmittances of two adjacent rows of pixels, causing different display brightness of two adjacent rows of pixels in gray scale display, and causing poor display of horizontal strips.

BRIEF SUMMARY OF THE INVENTION

An array substrate and a liquid crystal display panel including the array substrate are provided according to the disclosure.

An array substrate according to the disclosure includes: a substrate; multiple scanning lines and multiple data lines which are arranged above the substrate, where the scanning lines cross the data lines to define a plurality of pixel regions; multiple switch elements disposed in close proximity to the intersection of the scanning lines and the data lines; pixel electrodes and common electrodes, where each of the pixel electrodes and/or the common electrode includes a strip-type electrode locating in the pixel region and includes a straight-line portion. Straight-line portions of the strip-type electrodes in two pixel regions adjacent to each other in an extension direction of the data line are substantially symmetric about an extension direction of the scanning line. The array substrate further includes an alignment layer arranged above the substrate, where the alignment direction is substantially perpendicular to the extension direction of the scanning line, and an angle between an extension direction of the straight line portion and the alignment direction of the alignment layer is greater than or equal to 4 degrees and less than or equal to 6 degrees.

A liquid crystal display panel including the above-described array substrate is further provided according to the disclosure. The liquid crystal display panel includes the array substrate, a color film substrate arranged opposite to the array substrate, and a liquid crystal layer between the array substrate and the color film substrate.

According to the disclosure, the angle between the extension direction of the straight line portion of the strip-type electrode and the alignment direction of the alignment layer is greater than or equal to 4 degrees and less than or equal to 6 degrees, which can improve transmittance discrepancy between two pixel regions adjacent to each other in the extension direction of the data line in a case of alignment deviation, so that the transmittances of two pixel regions adjacent to each other in the extension direction of the data line are substantially equal in the case of alignment deviation, thereby improving non-uniformity display of horizontal strips.

DETAILED DESCRIPTION OF THE INVENTION

To make the purpose, features and advantages more apparent and understandable, the disclosure is described in detail in the following in conjunction with drawings and embodiments.

It should be noted that details are illustrated in the following description for fully understanding the disclosure. The invention can also be implemented by various other embodiments different from the description herein, and a person of skills in the art can make similar extensions without departing from the spirit of the disclosure. Therefore, the invention is not limited to the following embodiments.

Figure 1A:
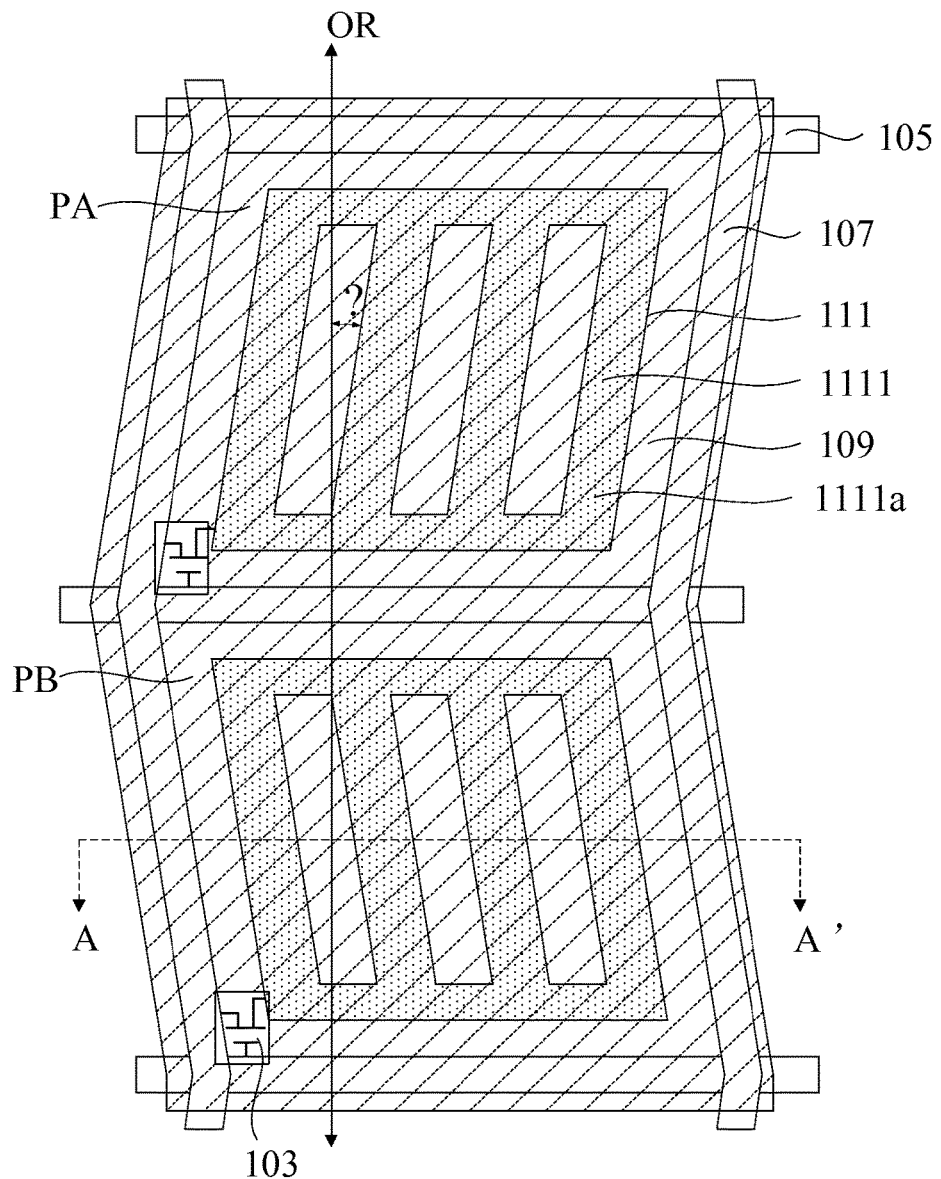
FIG. 1A is a schematic top view of an array substrate according to an embodiment of the disclosure.
Figure 1B:
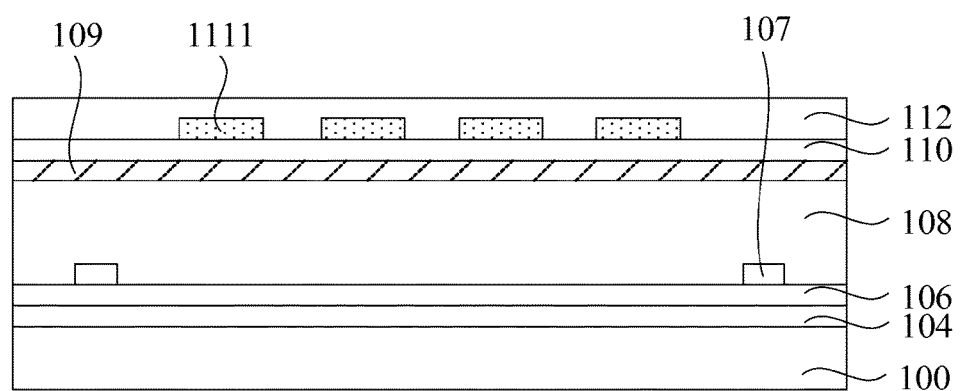
FIG. 1B is a simplified sectional view of the array substrate in FIG. 1A taken along the line AA'.

Reference is made to FIG. 1A and FIG. 1B. FIG. 1A is a schematic top view of an array substrate according to an embodiment of the disclosure, and FIG. 1B is a simplified sectional view of the array substrate in FIG. 1A taken along the line AA'.

Referring to FIG. 1A and FIG. 1B, the array substrate according to the embodiment includes: a substrate 100; multiple scanning lines 105 and multiple data lines 107 arranged above the substrate 100, where the scanning lines 105 cross the data lines 107 to define a plurality of pixel regions; switch elements 103 disposed in close proximity to the intersection of the scanning lines 105 and the data lines 107; pixel electrodes 111 and common electrodes 109, where the pixel electrode 111 includes strip-type electrodes 1111 located in the pixel region and including straight line portions 1111a, and the straight line portions 1111a of the strip-type electrodes 1111 in two pixel regions adjacent to each other in an extension direction of the data line 107 are substantially symmetric about an extension direction of the scanning line 105; and an alignment layer 112 arranged above the substrate 100, where the alignment direction OR of the alignment layer 112 is substantially perpendicular to the extension direction of the scanning line 105, and an angle θ between an extension direction of the straight line portion 1111a and the alignment direction OR of the alignment layer 112 is equal to 4 degree.

Still referring to FIG. 1A and FIG. 1B, the array substrate according to the embodiment includes the substrate 100, and a semiconductor layer, a first insulating layer 104, a gate metal layer, a second insulating layer 106, a source-drain metal layer, a planarization layer 108, the common electrodes 109, a third insulating layer 110, the pixel electrodes 111 and the alignment layer 112 which are arranged on the substrate 100 in sequence. In the embodiment, the semiconductor layer is made of polycrystalline silicon. In the embodiment, the gate metal layer includes the scanning lines 105 and gates electrically connected to the scanning lines 105, and the source-drain metal layer includes the data lines 107, sources electrically connected to the data lines and drains electrically connected to the pixel electrodes 111. The gate, the semiconductor layer, the source and the drain form the switch element 103 in the embodiment. It should be noted that the embodiment is illustrated by taking the polycrystalline silicon as an example, and the semiconductor layer may also be made of amorphous silicon or oxide semiconductor in other embodiment of the disclosure.

In the embodiment, multiple scanning lines 105 extending along the horizontal direction and multiple data lines 107 substantially extending along the vertical direction are arranged above the substrate 100. The scanning lines 105 cross the data lines 107 to define a plurality of pixel regions. That is, two adjacent scanning lines 105 cross two adjacent data lines 107 to define a pixel region. As shown in FIG. 1A, only two pixel regions PA and PB adjacent to each other in the extension direction of the data line 107 are illustrated for description, and the disclosure is not limited to this structure in implementation.

The switch elements 103 are in close proximity to the intersection of the scanning lines 105 and the data lines 107. Each pixel region is provided with a switch element 103, and the switch element 103 is electrically connected to one scanning line 105 and one data line 107. The switch element 103 in different pixel region corresponds to different combination of scanning line 105 and data line 107.

Each pixel region is provided with a pixel electrode 111 and a common electrode 109. In a case that driving voltages are applied to the pixel electrode 111 and the common electrode 109, respectively, an electric field, which drives rotation of liquid crystal molecules in the liquid crystal layer of the liquid crystal display panel, is formed between the pixel electrode 111 and the common electrode 109. The pixel electrode 111 is arranged opposite to the common electrode 109 with the third insulating layer 110 being arranged between the pixel electrode 111 and the common electrode 109, and the common electrode 109 is closer to the substrate 100 than the pixel electrode 111. The planarization layer 108 is arranged between the common electrode 109 and the substrate 100, thereby improving flatness of the array substrate, increasing the distance between the common electrode 109 and the data lines 107, and reducing power consumption of the array substrate.

Still referring to FIG. 1A and FIG. 1B, in the embodiment, the pixel electrode 111 includes strip-type electrodes 1111. That is, the pixel electrode 111 includes multiple strip-type electrodes 1111. In the embodiment, the common electrode 109 is a planar electrode, and has an opening in a region where the switch element 103 locates. Alternatively, in other embodiments of the disclosure, only the common electrode includes multiple strip-type electrodes, or the common electrode and the pixel electrode both include multiple strip-type electrodes, i.e., the pixel electrode and/or the common electrode includes strip-type electrodes. FIG. 1a and FIG. 1b are only illustrative, and do not mean to limit the disclosure.

In the embodiment, in each pixel region, the pixel electrode 111 includes 4 strip-type electrodes 1111. In other embodiment, the number of the strip-type electrodes is preferably in a range of 1 to 4. Because of increasingly requirements on higher display quality, higher display accuracy and smaller pixel size, good display effect can be achieved by using strip-type electrodes the number of which is in a range of 1 to 4, in view of the requirement on pixel size and device accuracy. In the case that the number of the electrodes is in a range of 1 to 4, the array substrate can reach a resolution equal to or great than 250 pixel per inch (PPI), and thus better viewing effect and image quality are achieved.

Still referring to FIG. 1A and FIG. 1B, in the embodiment, the strip-type electrode 1111 includes a straight line portion 1111a. The straight line portions 1111a of the strip-type electrodes 1111 in two pixel regions adjacent to each other in the extension direction of the data line 107 are substantially symmetric about the extension direction of the scanning line 105. That is, extension directions of the straight line portions 1111a of the strip-type electrodes 1111 in the two pixel regions adjacent to each other in the vertical direction intersect with each other, and the extension direction of the scanning line 105 is in an angular bisector of an angle between corresponding straight line portions 1111a of the strip-type electrodes 1111 in the two pixel regions adjacent to each other in the vertical direction. That is, the pixel electrodes 111 in the two pixel region adjacent to each other in the vertical direction are symmetrically designed, i.e., are in a pseudo double-domain structure. With the pseudo double-domain structure, transmittances and gray scales of two rows of pixels adjacent to each other in the vertical direction in different visual angles can be compensated, thereby improving viewing angle and gray scale inversion.

Preferably, in the embodiment, the data lines 107 are fold lines. The data lines 107 are parallel to the straight line portions 1111a in the pixel region. That is, horizontal distances between the data line 107 and the straight line portion 1111a of the strip-type electrode 1111 in the pixel region adjacent to the data line 107 are equal, thereby improving an aperture ratio of the pixel region and thus the transmittance of the display panel in this structure. In other embodiment of the disclosure, the data line may be straight.

The alignment layer 112 is arranged above the substrate 100, and covers other layers on the substrate 100. Referring to FIG. 1A, the alignment direction OR of the alignment layer 112 is substantially perpendicular to the extension direction of the scanning lines 105, i.e., the alignment direction OR of the alignment layer extends along the vertical direction. For a liquid crystal display panel prepared by using the array substrate, long axes of liquid crystal molecules in a liquid crystal layer are parallel to the alignment direction OR in an initial state.

Referring to FIG. 1A and FIG. 1B, specifically, the angle θ between the extension direction of the straight line portion 1111a and the alignment direction OR of the alignment layer 112 is equal to 4 degree, which can improve transmittance discrepancy between two pixel regions adjacent to each other in the extension direction of the data line for the array substrate in a case of alignment deviation, so that the transmittances of two pixel regions adjacent to each other in the extension direction of the data line are substantially equal in the case of alignment deviation, thereby improving non-uniformity display of horizontal strips.

Contrast experiments for transmittances (AR %) of two pixel regions PA and PB adjacent to each other in the vertical direction under different angles θ are made, to obtain the relationship between the transmittance and the angle which is between the alignment direction OR and the extension directions of the straight line portions 1111a of the strip-type electrodes 1111 in the two pixels adjacent to each other in the vertical direction. Table 1 is a data table showing discrepancies between transmittances of pixel regions PA and PB under different alignment deviations MA and different angles θ.

TABLE 1

| alignment deviation (μm) | region | AR % (7°) | AR % (6°) | AR % (5°) | AR % (4°) |
|---|---|---|---|---|---|
| MA = −3 | PA | 45.35% | 45.35% | 45.28% | 45.13% |
|  | PB | 43.30% | 43.46% | 43.74% | 43.91% |
|  | PA-PB | 4.52% | 4.17% | 3.40% | 2.7% |
| MA = −1.5 | PA | 51.15% | 51.17% | 51.16% | 51.11% |
|  | PB | 50.28% | 50.37% | 50.55% | 50.60% |
|  | PA-PB | 1.70% | 1.56% | 1.19% | 1.00% |
| MA = 0 | PA | 53.59% | 53.72% | 53.79% | 53.74% |
|  | PB | 53.60% | 53.68% | 53.75% | 53.71% |
|  | PA-PB | −0.02% | 0.07% | 0.07% | 0.06% |
| MA = 1.5 | PA | 51.67% | 51.27% | 51.26% | 51.11% |
|  | PB | 49.98% | 50.19% | 50.30% | 50.40% |
|  | PA-PB | 3.27% | 2.11% | 1.87% | 1.39% |
| MA = 3 | PA | 46.20% | 45.65% | 45.55% | 45.31% |
|  | PB | 43.21% | 43.54% | 43.74% | 43.91% |
|  | PA-PB | 6.47% | 4.62% | 3.97% | 3.09% |

It can be seen from Table 1 that, in the case that there is no alignment deviation (MA=0), the transmittance of the pixel region PA is close to that of the pixel region PB, and the discrepancy between the transmittances of the pixel regions PA and PB is smaller than 1%. The discrepancy between the transmittances of the pixel regions PA and PB gradually increases with increase of the alignment deviation, which is caused by the fact that in spite of symmetric designs of the pixel electrodes 111 and the common electrodes 109 in the pixel regions PA and PB, the switch elements 103 are located at the crossings of the scanning lines 105 and the data lines 107 and have slightly different structures due to different inclination angles of the pixel electrodes 111 and the common electrodes 109 in the upper and lower pixel regions, which finally causes asymmetry between the pixel regions PA and PB.

It can be seen from Table 1 that under different alignment deviations (MA is equal to 3, 1.5, −1.5 or −3), the discrepancy between transmittances for pixel regions PA and PB in the case that the angle θ is 4 degrees, 5 degrees or 6 degrees is smaller than the discrepancy between transmittances for pixel regions PA and PB in the case that the angle θ is 7 degrees. That is, in the case that the angle θ is 4 degrees, 5 degrees or 6 degrees, the transmittances of two pixel regions adjacent to each other in the vertical direction are close to each other. Therefore, for a display panel with such structure, non-uniformity display of horizontal strips caused by discrepancy between transmittances of two adjacent rows of pixels can be improved.

For the display panel in which the angle θ between the alignment direction OR of the alignment layer 112 and the extension direction of the straight-line portion 1111a is greater than or equal to 4 degrees and is smaller than or equal to 6 degrees, horizontal strips can be improved. The case that the angle θ is equal to 4 degrees is taken as an example in the embodiment. In other embodiment of the disclosure, θ may be any angle which is greater than or equal to 4 degrees and is less than or equal to 6 degrees. In the embodiment, the angle between the extension direction of the straight line portion of the stripe-type electrode and the alignment direction of the alignment layer is equal to 4 degree, which can improve transmittance discrepancy between two pixel regions adjacent to each other in the extension direction of the data line in a case of alignment deviation, so that the transmittances of two pixel regions adjacent to each other in the extension direction of the data line are substantially equal in the case of alignment deviation, thereby improving non-uniformity display of horizontal strips.

Furthermore, reference is made to FIG. 1A, FIG. 1B and Table 2. Table 2 is a data table showing discrepancies between transmittances of pixel regions PA and PB under different alignment deviations MA and different angles θ, where the angle θ between the extension direction of the straight line portion 1111a and the alignment direction of the alignment layer 112 is greater than or equal to 4 degrees and is less than or equal to 5 degrees.

TABLE 2

| alignment deviation (μm) | region | AR % (7°) | AR % (5°) | AR % (4.5°) | AR % (4°) |
|---|---|---|---|---|---|
| MA = −3 | PA | 45.35% | 45.28% | 45.22% | 45.13% |
| | PB | 43.30% | 43.74% | 43.85% | 43.91% |
| | PA-PB | 4.52% | 3.40% | 3.03% | 2.7% |
| MA = −1.5 | PA | 51.15% | 51.16% | 51.14% | 51.11% |
| | PB | 50.28% | 50.55% | 50.60% | 50.60% |
| | PA-PB | 1.70% | 1.19% | 1.06% | 1.00% |
| MA = 0 | PA | 53.59% | 53.79% | 53.76% | 53.74% |
| | PB | 53.60% | 53.75% | 53.70% | 53.71% |
| | PA-PB | −0.02% | 0.07% | 0.11% | 0.06% |
| MA = 1.5 | PA | 51.67% | 51.26% | 51.20% | 51.11% |
| | PB | 49.98% | 50.30% | 50.30% | 50.40% |
| | PA-PB | 3.27% | 1.87% | 1.76% | 1.39% |
| MA = 3 | PA | 46.20% | 45.55% | 45.45% | 45.31% |
| | PB | 43.21% | 43.74% | 43.82% | 43.91% |
| | PA-PB | 6.47% | 3.97% | 3.59% | 3.09% |

Combined with data in Table 1 and Table 2, it can be seen that under different alignment deviations, the discrepancy between transmittances of the pixel regions PA and PB in a case that the angle θ is 4 degrees, 4.5 degrees or 5 degrees is smaller than the discrepancy between transmittances of the pixel regions PA and PB in the case that the angle θ is 7 degrees and is smaller than the discrepancy between transmittances of the pixel regions PA and PB in the case that the angle θ is 6 degrees which are shown in table 1. Therefore, non-uniformity display of horizontal strips can be better improved in a case that the angle is greater than or equal to 4 degrees and is less than or equal to 5 degrees. Combined with the data in Table 1 and Table 2, under different alignment deviations or no alignment deviation, the transmittance of the single pixel region PA or the single pixel region PB in a case that the angle θ is 4 degrees, 4.5 degrees or 5 degrees is greater than the transmittance of the single pixel region PA or the single pixel region PB in the case that the angle θ is 6 degrees or 7 degrees. Therefore, in the case that the angle θ is greater than or equal to 4 degrees and is less than or equal to 5 degrees, the transmittance of a single pixel of the array substrate or the display panel can be improved, thereby improving the transmittance of the entire display panel and reducing the power consumption. In other embodiment of the disclosure, the angle θ between the alignment direction OR of the alignment layer 112 and the extension direction of the straight line portion 1111 is greater than or equal to 4 degrees and is less than or equal to 5 degrees, which can improve non-uniformity display of horizontal strips and improve transmittances of the array substrate and the display panel.

In another aspect, the viewing angle of the array substrate or the display panel is related to the angle between the extension direction of the straight line portion and the alignment direction of the alignment layer. Still referring to FIG. 1A and FIG. 1B, the wider the angle θ is, the wider the angle between the extension directions of the straight-line portions 1111a of the pixel electrodes 111 in the pixel regions PA and PB is. In the case that driving voltages are applied to the pixel electrodes 111 and the common electrodes 109 respectively, electric fields whose directions are substantially perpendicular to the extension directions of the straight-line portions 1111a are formed in the pixel regions PA and PB, liquid crystal molecules in liquid crystal layer corresponding to the pixel regions PA and PB are inversed towards two opposite directions under the electric fields. In this case, in different viewing directions, the color perceived by human eyes is an effect of a combination of pixel regions PA and PB. Since the straight line portions 1111a extend along two directions respectively, mutual compensation of pixel regions PA and PB for optical phase delay can improve color deviation and increase viewable angle. That is, in the case that the angle θ is less than or equal to 6 degrees and is greater than or equal to 5 degrees, color deviation and gray scale inversion of the display panel with the array substrate can be improved, and the viewable angle is also increased. In other embodiment of the disclosure, the angle θ between the alignment direction OR of the alignment layer 112 and the extension direction of the straight line portion 1111 is greater than or equal to 5 degrees and is less than or equal to 6 degrees, which can improve non-uniformity display of horizontal strips, improve the color deviation and gray scale inversion of the display panel with the array substrate, and increase the viewable angle.

In the array substrate according to the embodiment, the angle between the extension direction of straight line portion 1111a of the strip-type electrode 1111 and alignment direction OR of the alignment layer 112 is equal to 4 degree, which can improve transmittance discrepancy between two pixel regions adjacent to each other in the extension direction of the data line in a case of alignment deviation, so that the transmittances of two pixel regions adjacent to each other in the extension direction of the data line are substantially equal in the case of alignment deviation, thereby improving non-uniformity display of horizontal strips. In addition, the transmittance of a single pixel of the array substrate or the display panel is also improved, and thus the transmittance of the entire display panel is improved and the power consumption is reduced.

Figure 2A:
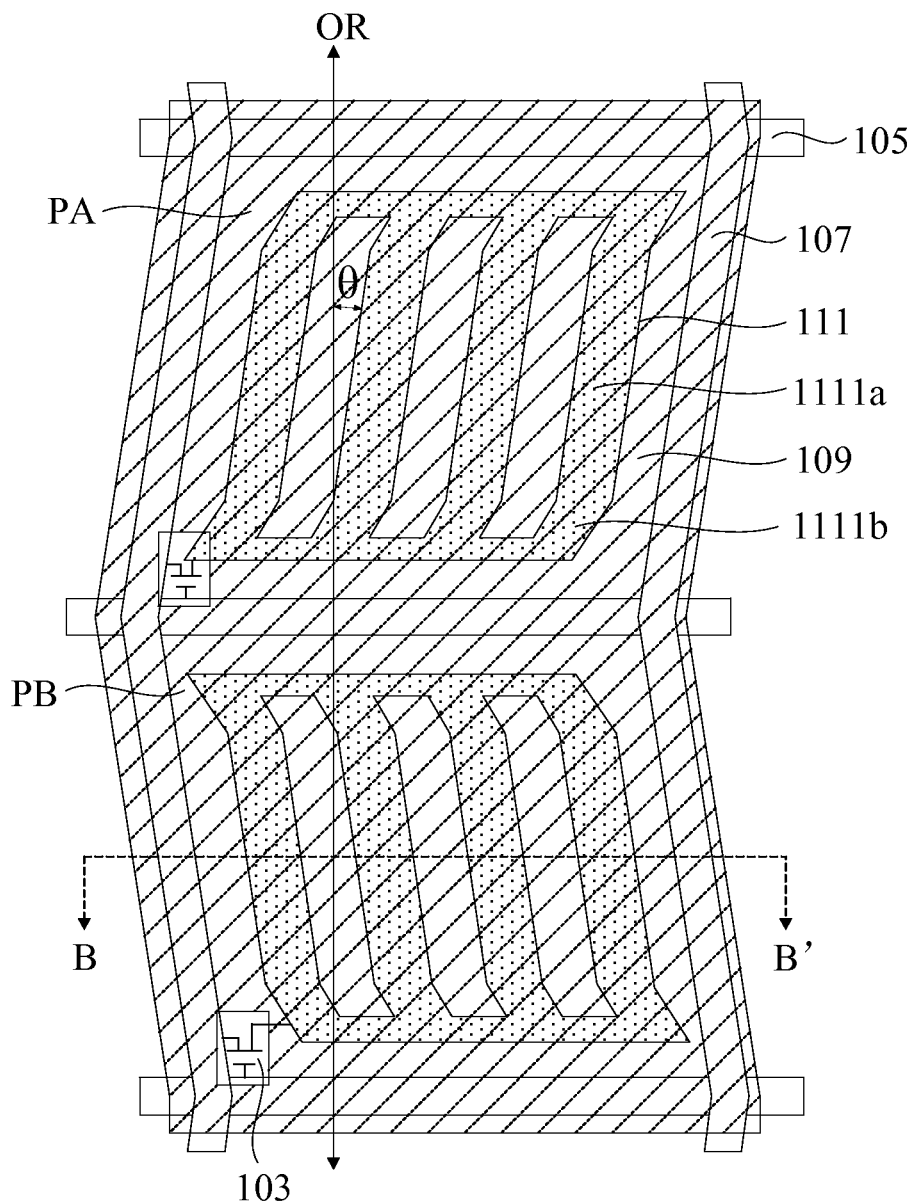
FIG. 2A is a schematic top view of an array substrate according to another embodiment of the disclosure.
Figure 2B:
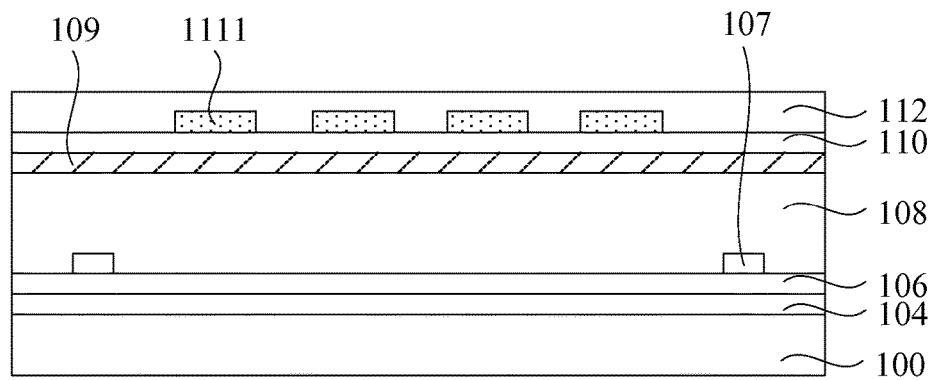
FIG. 2B is a simplified sectional view of the array substrate in FIG. 2A taken along the line BB'.

Reference is made to FIG. 2A and FIG. 2B. FIG. 2A is a schematic top view of an array substrate according to another embodiment of the disclosure, and FIG. 2B is a simplified sectional view of the array substrate in FIG. 2A taken along the line BB'.

Referring to FIG. 2A and FIG. 2B, the array substrate according to the embodiment includes: a substrate 100; multiple scanning lines 105 and multiple data lines 107 which are arranged above the substrate 100, where the scanning lines 105 cross the data lines 107 to define a plurality of pixel regions; switch elements 103 disposed in close proximity to the intersection of the scanning lines 105 and the data lines 107; pixel electrodes 111 and common electrodes 109, where the pixel electrode 111 includes strip-type electrodes 1111 located in the pixel region and including straight line portions 1111a, and the straight line portions 1111a of the strip-type electrodes 1111 in two pixel regions PA and PB adjacent to each other in an extension direction of the data line 107 are substantially symmetric about an extension direction of the scanning line 105; and an alignment layer 112 arranged above the substrate 100, where the alignment direction OR of the alignment layer 112 is substantially perpendicular to the extension direction of the scanning line 105, and an angle θ between an extension direction of the straight-line portion 1111a and the alignment direction OR of the alignment layer 112 is equal to 4.5 degrees.

Still referring to FIG. 2A and FIG. 2B, the array substrate according to the embodiment includes the substrate 100 and a semiconductor layer, a first insulating layer 104, a gate metal layer, a second insulating layer 106, a source-drain metal layer, a planarization layer 108, the common electrodes 109, a third insulating layer 110, pixel electrodes 111 and the alignment layer 112 which are arranged on the substrate 100 in sequence. In the embodiment, the semiconductor layer is made of polycrystalline silicon. In the embodiment, the gate metal layer includes the scanning lines 105 and gates electrically connected to the scanning lines 105, and the source-drain metal layer includes the data lines 107, sources electrically connected to the data lines and drains electrically connected to the pixel electrodes 111. The gate, the semiconductor layer, the source and the drain form the switch element 103 in the embodiment. It should be noted that, the embodiment is illustrated by taking the polycrystalline silicon as an example, and the semiconductor layer may also be made of amorphous silicon or oxide semiconductor in other embodiment of the disclosure.

In the embodiment, the multiple scanning lines 105 extending along the horizontal direction and the multiple data lines 107 substantially extending along the vertical direction are arranged above the substrate 100. The multiple scanning lines 105 cross the multiple data lines 107 to define multiple pixel regions. That is, two adjacent scanning lines 105 cross two adjacent data lines 107 to define a pixel region. As shown in FIG. 2A, only two pixel regions PA and PB adjacent to each other in the extension direction of the data line 107 are illustrated for description, and the disclosure is not limited to this structure in implementation.

The switch elements 103 are disposed in close proximity to the intersection of the scanning lines 105 and the data lines 107. Each pixel region is provided with a switch element 103, and the switch element 103 is electrically connected to one scanning line 105 and one data line 107. The switch element 103 in different pixel region corresponds to different combination of scanning line 105 and data line 107.

Each pixel region is provided with a pixel electrode 111 and a common electrode 109. In a case that driving voltages are applied to the pixel electrode 111 and the common electrode 109 respectively, an electric field, which drives rotation of liquid crystal molecules in the liquid crystal layer of the liquid crystal display panel, is formed between the pixel electrode 111 and the common electrode 109. The pixel electrode 111 is arranged opposite to the common electrode 109 with the third insulating layer 110 being arranged between the pixel electrode 111 and the common electrode 109, and the common electrode 109 is closer to the substrate 100 than the pixel electrode 111. The planarization layer 108 is arranged between the common electrode 109 and the substrate 100, thereby improving flatness of the array substrate, increasing the distance between the common electrode 109 and the data lines 107, and reducing power consumption of the array substrate.

Still referring to FIG. 2A and FIG. 2B, in the embodiment, the pixel electrode 111 includes strip-type electrodes 1111, and the pixel electrode 111 includes four strip-type electrodes 1111. In the embodiment, the common electrode 109 is a planar electrode, and has an opening in the region where the switch element 103 locates. In other embodiment of the disclosure, only the common electrode includes multiple strip-type electrodes, or the common electrode and the pixel electrode both include multiple strip-type electrodes, i.e., the pixel electrode and/or the common electrode includes strip-type electrodes. FIG. 2A and FIG. 2B are only illustrative, and do not mean to limit the disclosure. In other embodiment according to the disclosure, the number of the strip-type electrodes in each pixel region is preferably in a range of 1 to 4. Because of increasingly requirements on higher display quality, higher display accuracy and smaller pixel size, good display effect can be achieved by using strip-type electrodes the number of which is in a range of 1 to 4, in view of the requirement on pixel size and device accuracy. In a case that the number of the electrodes is in a range of 1 to 4, the array substrate can reach a resolution equal to or great than 250 pixel per inch (PPI), and thus better viewing effect and image quality are achieved.

Still referring to FIG. 2A and FIG. 2B, in the embodiment, the strip-type electrode 1111 includes a straight line portion 1111a. The straight line portions 1111a of the strip-type electrodes 1111 in the two pixel regions adjacent to each other in the extension direction of the data line 107 are substantially symmetric about the extension direction of the scanning line 105. That is, extension directions of the straight line portions 1111a of the strip-type electrodes 1111 in the two pixel regions adjacent to each other in the vertical direction intersect with each other, and the extension direction of the scanning line 105 is in an angular bisector of an angle between corresponding straight line portions 1111a of the strip-type electrodes 1111 in the two pixel regions adjacent to each other in the vertical direction. That is, the pixel electrodes 111 in the two pixel region adjacent to each other in the vertical direction are symmetrically designed, i.e., are in a pseudo double-domain structure. With the pseudo double-domain structure, transmittances and gray scales of two rows of pixels adjacent to each other in the vertical direction in different visual angles can be compensated, thereby improving viewing angle and gray scale inversion.

In the embodiment, the strip-type electrode 1111 further includes corner portions 1111b which are located at two ends of the straight line portion 1111a. An angle between the extension direction of the corner portion 1111b and the alignment direction OR of the alignment layer 112 is greater than the angle between the extension direction of the straight line portion 1111a and the alignment direction OR of the alignment layer 112. In the array substrate with this structure, because of arrangement of the corner portions, the electrical fields between the common electrodes 109 and the pixel electrodes 111 at the regions of the corner portions are enhanced, and non-uniformity display at the corner portions is improved. It should be noted that the embodiment is illustrated by taking the case that the corner portions 1111b are located at two ends of the straight line portion 1111a as an example. In other embodiment, the corner portion 1111b may be located at any one end of the straight line portion 1111a, i.e., the strip-type electrode 1111 includes a corner portion 1111b which is located at at least one end of the straight line portion 1111a.

Preferably, in the embodiment, the data lines 107 are fold lines. The data lines 107 are parallel to the straight line portions 1111a in the pixel region. That is, horizontal distances between the data line 107 and the straight line portion 1111a of the strip-type electrode 1111 in the pixel region adjacent to the data line 107 are equal, thereby improving an aperture ratio of the pixel region and thus the transmittance of the display panel in this structure. In other embodiment of the disclosure, the data line may be a straight line.

The alignment layer 112 is arranged above the substrate 100, and covers other layers on the substrate 100. Referring to FIG. 2A, the alignment direction OR of the alignment layer 112 is substantially perpendicular to the extension direction of the scanning lines 105, i.e., the alignment direction OR of the alignment layer extends along the vertical direction. The angle θ between the extension direction of the straight line portion 1111a and the alignment direction OR of the alignment layer 112 is equal to 4.5 degrees, which can improve transmittance discrepancy between two pixel regions adjacent to each other in the extension direction of the data line for the array substrate in a case of alignment deviation, so that the transmittances of two pixel regions adjacent to each other in the extension direction of the data line are substantially equal in the case of alignment deviation, thereby improving non-uniformity display of horizontal strips.

It should be noted that the case that the angle θ between the extension direction of the straight line portion 1111a and the alignment direction OR of the alignment layer 112 is equal to 4.5 degree is taken as an example in the embodiment. In other embodiment of the disclosure, θ may be any angle which is greater than or equal to 4 degree and is smaller than or equal to 6 degree, which can improve non-uniformity display of horizontal strips. Preferably, the angle θ between the extension direction of the straight line portion 1111a and the alignment direction OR of the alignment layer 112 is greater than or equal to 4 degree and is smaller than or equal to 5 degree, which can improve non-uniformity display of horizontal strips, and further can improve transmittance of a single pixel in the array substrate or the display panel and thus the transmittance of the entire display panel, and reduce the power consumption. Alternatively, the angle θ between the alignment direction OR of the alignment layer 112 and the extension direction of the straight line portion 1111a is greater than or equal to 5 degrees and is smaller than or equal to 6 degrees, which can improve non-uniformity display of horizontal strips, improve the color deviation and gray scale inversion of the display panel with the array substrate, and increase the viewable angle.

In the array substrate according to the embodiment, the angle between the extension direction of straight line portion 1111a of the strip-type electrode 1111 and the alignment direction OR of the alignment layer 112 is equal to 4.5 degree, which can improve transmittance discrepancy between two pixel regions adjacent to each other in the extension direction of the data line in a case of alignment deviation, so that the transmittances of two pixel regions adjacent to each other in the extension direction of the data line are substantially equal in the case of alignment deviation, thereby improving non-uniformity display of horizontal strips. In addition, the transmittance of a single pixel of the array substrate or the display panel is also improved, and thus the transmittance of the entire display panel is improved and the power consumption is reduced.

Figure 3A:
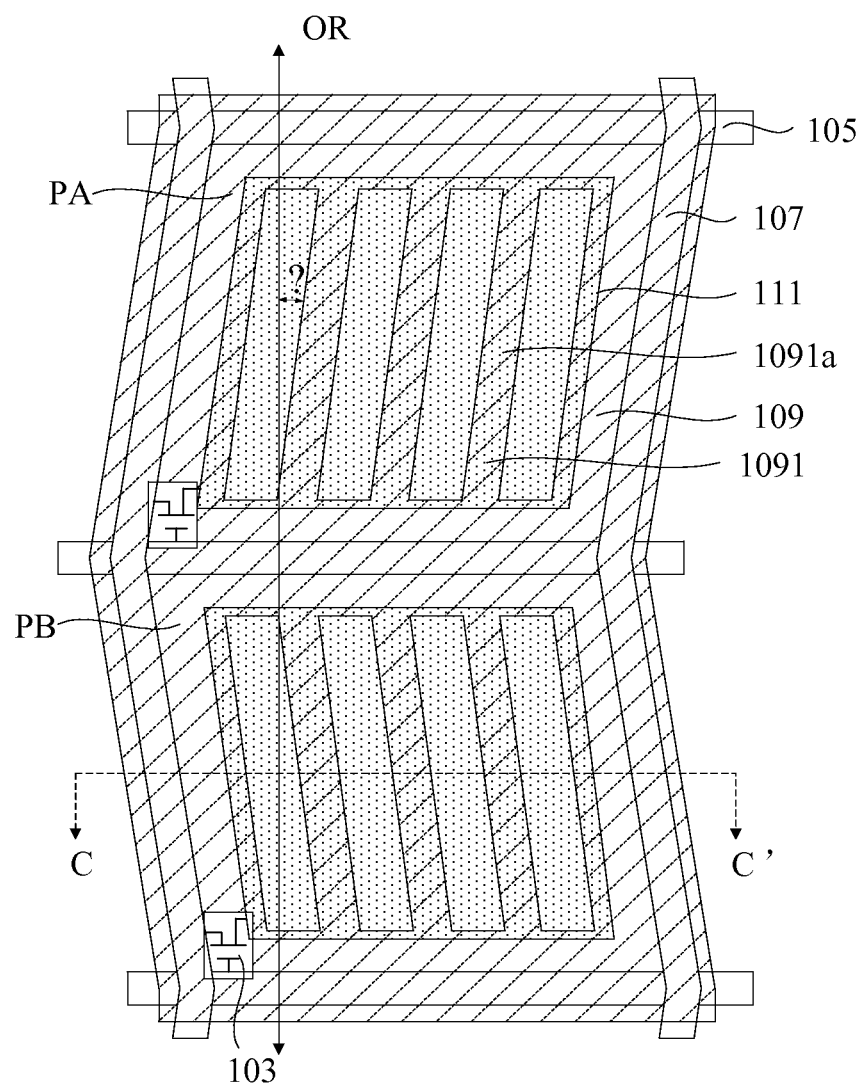
FIG. 3A is a schematic top view of an array substrate according to another embodiment of the disclosure.
Figure 3B:
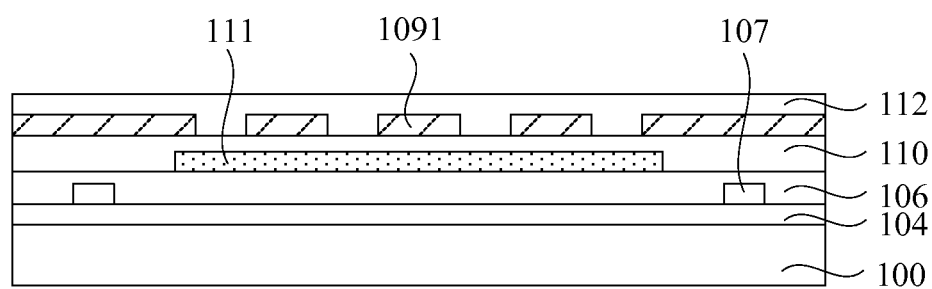
FIG. 3B is a simplified sectional view of the array substrate in FIG. 3A taken along the line CC'.

Reference is made to FIG. 3A and FIG. 3B. FIG. 3A is a schematic top view of an array substrate according to another embodiment of the disclosure, and FIG. 3B is a schematic section view of the array substrate in FIG. 3a taken along CC'.

Referring to FIG. 3A and FIG. 3B, the array substrate according to the embodiment includes: a substrate 100; multiple scanning lines 105 and multiple data lines 107 which are arranged above the substrate 100, where the multiple scanning lines 105 cross the multiple data lines 107 to define multiple pixel regions; switch elements 103 close to crossings of the scanning lines 105 and the data lines 107; pixel electrodes 111 and common electrodes 109, where the common electrode 109 includes strip-type electrodes 1091 locating in the pixel region and including straight line portions 1091a, and the straight line portions 1091a of the strip-type electrodes 1091 in two pixel regions PA and PB adjacent to each other in an extension direction of the data line 107 are substantially symmetric about an extension direction of the scanning line 105; and an alignment layer 112 arranged above the substrate 100, where the alignment direction OR of the alignment layer 112 is substantially perpendicular to the extension direction of the scanning line 105, and an angle θ between an extension direction of the straight line portion 1091a and the alignment direction OR of the alignment layer 112 is equal to 5 degree.

Still referring to FIG. 3A and FIG. 3B, the array substrate according to the embodiment includes the substrate 100 and a gate metal layer, a first insulating layer 104, a semiconductor layer, a source-drain metal layer, a second insulating layer 106, pixel electrodes 111, a third insulating layer 110, common electrodes 109 and the alignment layer 112 which are arranged on the substrate 100 in sequence. In the embodiment, the semiconductor layer is made of amorphous silicon. In the embodiment, the gate metal layer includes the scanning lines 105 and gates electrically connected to the scanning lines 105, and the source-drain metal layer includes the data lines 107, sources electrically connected to the data lines and drains electrically connected to the pixel electrodes 111. The gate, the semiconductor layer, the source and the drain form the switch element 103 in the embodiment. It should be noted that, the embodiment is illustrated by taking the amorphous silicon as an example, and the semiconductor layer may also be made of polycrystalline silicon or oxide semiconductor in other embodiment of the disclosure.

In the embodiment, the multiple scanning lines 105 extending along the horizontal direction and the multiple data lines 107 substantially extending along the vertical direction are arranged above the substrate 100. The multiple scanning lines 105 cross the multiple data lines 107 to define multiple pixel regions. That is, two adjacent scanning lines 105 cross two adjacent data lines 107 to define a pixel region. As shown in FIG. 3A, only two pixel regions PA and PB adjacent to each other in the extension direction of the data line 107 are illustrated for description, and the disclosure is not limited to this structure in implementation.

The switch elements 103 are in close proximity to the intersection of the scanning lines 105 and the data lines 107. Each pixel region is provided with a switch element 103, and the switch element 103 is electrically connected to one scanning line 105 and one data line 107. The switch element 103 in different pixel region corresponds to different combination of scanning line 105 and data line 107.

Each pixel region is provided with a pixel electrode 111 and a common electrode 109. In a case that driving voltages are applied to the pixel electrode 111 and the common electrode 109 respectively, an electric field, which drives rotation of liquid crystal molecules in the liquid crystal layer of the liquid crystal display panel, is formed between the pixel electrode 111 and the common electrode 109. The pixel electrode 111 is arranged opposite to the common electrode 109 with the third insulating layer 110 being arranged between the common electrode 109 and the pixel electrode 111, and the pixel electrode 111 is closer to the substrate 100 than the common electrode 109. Because of absence of a planarization layer, vias in the layers are reduced, thereby improving an aperture ratio of the pixel and thus improving transmittance of the display panel with the array substrate in this structure. It should be noted that the layers and the sequence of the layers are illustrative, and the disclosure is not limited to this structure in implementation.

Still referring to FIG. 3A and FIG. 3B, in the embodiment, the common electrode 109 includes strip-type electrodes 1091, and the common electrode 109 includes three strip-type electrodes 1091. In the embodiment, the pixel electrode 111 is a planar electrode. In other embodiment of the disclosure, only the pixel electrode includes multiple strip-type electrodes, or the common electrode and the pixel electrode both include multiple strip-type electrodes, i.e., the pixel electrode and/or the common electrodes include strip-type electrodes. FIG. 3A and FIG. 3B are only illustrative, and do not mean to limit the disclosure. In other embodiment according to the disclosure, the number of the strip-type electrodes in each pixel region is preferably in a range of 1 to 4. Because of increasingly requirements on higher display quality, higher display accuracy and smaller pixel size, good display effect can be achieved by using strip-type electrodes the number of which is in a range of 1 to 4, in view of the requirement on pixel size and device accuracy. In a case that the number of the electrodes is in a range of 1 to 4, the array substrate can reach a resolution equal to or great than 250 pixel per inch (PPI), and thus better viewing effect and image quality are achieved.

Still referring to FIG. 3A and FIG. 3B, in the embodiment, the strip-type electrode 1091 include a straight line portion 1091a. The straight line portions 1091a of the strip-type electrodes 1091 in the two pixel regions adjacent to each other in the extension direction of the data line 107 are substantially symmetric about the extension direction of the scanning line 105. That is, extension directions of the straight line portions 1091a of the strip-type electrodes 1091 in the two pixel regions adjacent to each other in the vertical direction intersect with each other, and the extension direction of the scanning line 105 is in an angular bisector of an angle between corresponding straight line portions 1091a of the strip-type electrodes 1091 in the two pixel regions adjacent to each other in the vertical direction. That is, the common electrodes 109 in the two pixel region adjacent to each other in the vertical direction are symmetrically designed, i.e., are in a pseudo double-domain structure. With the pseudo double-domain structure, transmittances and gray scales of two rows of pixels adjacent to each other in the vertical direction in different visual angles can be compensated, thereby improving viewing angle and gray scale inversion.

Preferably, in the embodiment, the data lines 107 are fold lines. The data lines 107 are parallel to the straight line portions 1091a in the pixel region. That is, horizontal distances between the data line 107 and the straight line portion 1091a of the strip-type electrode 1091 in the pixel region adjacent to the data line 107 are equal, thereby improving an aperture ratio of the pixel region and thus the transmittance of the display panel in this structure. In other embodiment of the disclosure, the data line may be a straight line.

The alignment layer 112 is arranged above the substrate 100, and covers other layers on the substrate 100. Referring to FIG. 3A, the alignment direction OR of the alignment layer 112 is substantially perpendicular to the extension direction of the scanning lines 105, i.e., the alignment direction OR of the alignment layer extends along the vertical direction. The angle θ between the extension direction of the straight line portion 1091a and the alignment direction OR of the alignment layer 112 is equal to 5 degrees, which can improve transmittance discrepancy between two pixel regions adjacent to each other in the extension direction of the data line for the array substrate in a case of alignment deviation, so that the transmittances of two pixel regions adjacent to each other in the extension direction of the data line are substantially equal in the case of alignment deviation, thereby improving non-uniformity display of horizontal strips.

It should be noted that the case that the angle θ between the extension direction of the straight line portion 1091a and the alignment direction OR of the alignment layer 112 is equal to 5 degree is taken as an example in the embodiment. In other embodiment of the disclosure, θ may be any angle which is greater than or equal to 4 degree and is smaller than or equal to 6 degree, which can improve non-uniformity display of horizontal strips. Preferably, the angle θ between the extension direction of the straight line portion 1091a and the alignment direction OR of the alignment layer 112 is greater than or equal to 4 degree and is smaller than or equal to 5 degree, which can improve non-uniformity display of horizontal strips, and further can improve transmittance of a single pixel in the array substrate or the display panel and thus the transmittance of the entire display panel, and reduce the power consumption. Alternatively, the angle θ between the alignment direction OR of the alignment layer 112 and the extension direction of the straight line portion 1091a is greater than or equal to 5 degrees and is smaller than or equal to 6 degree, which can improve non-uniformity display of horizontal strips, improve the color deviation and gray scale inversion of the display panel with the array substrate, and increase the viewable angle.

In the array substrate according to the embodiment, the angle between the extension direction of straight line portion 1091a of the strip-type electrode 1091 and the alignment direction OR of the alignment layer 112 is equal to 5 degree, which can improve transmittance discrepancy between two pixel regions adjacent to each other in the extension direction of the data line in a case of alignment deviation, so that the transmittances of two pixel regions adjacent to each other in the extension direction of the data line are substantially equal in the case of alignment deviation, thereby improving non-uniformity display of horizontal strips. In addition, the transmittance of a single pixel of the array substrate or the display panel is also improved, and thus the transmittance of the entire display panel is improved and the power consumption is reduced.

Figure 4A:
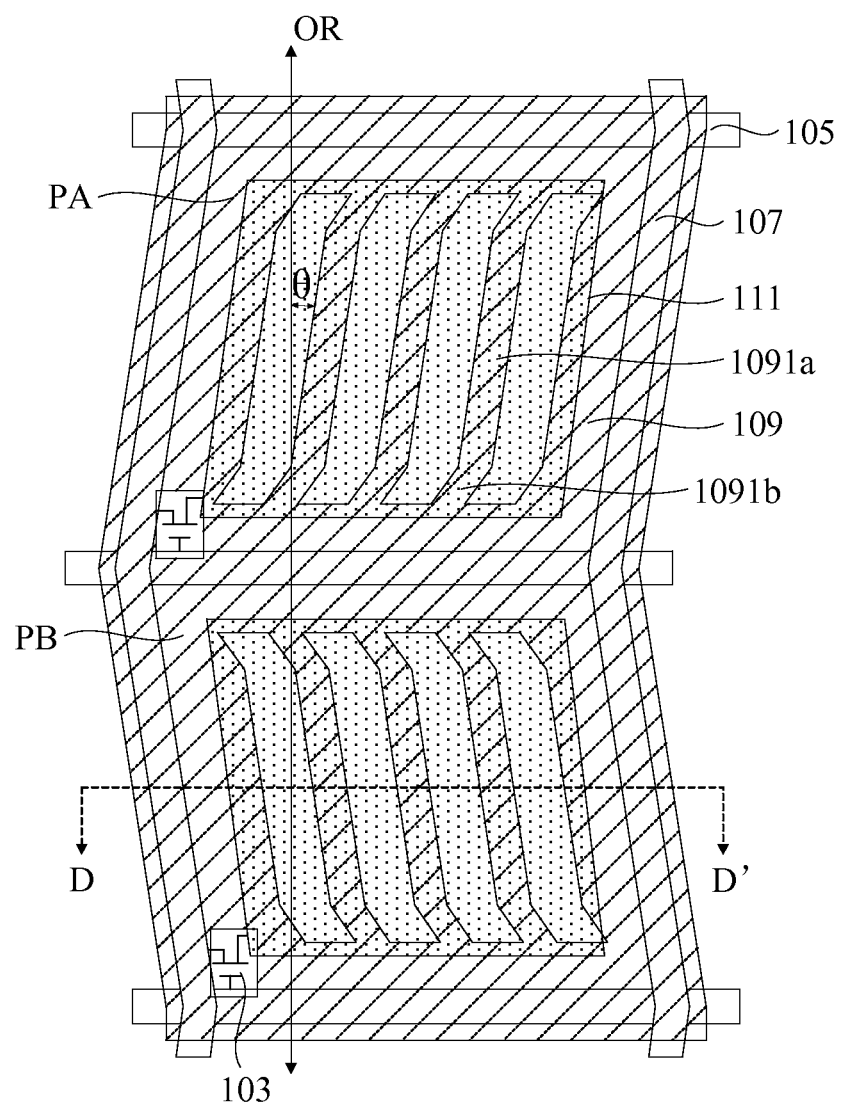
FIG. 4A is a schematic top view of an array substrate according to another embodiment of the disclosure.
Figure 4B:
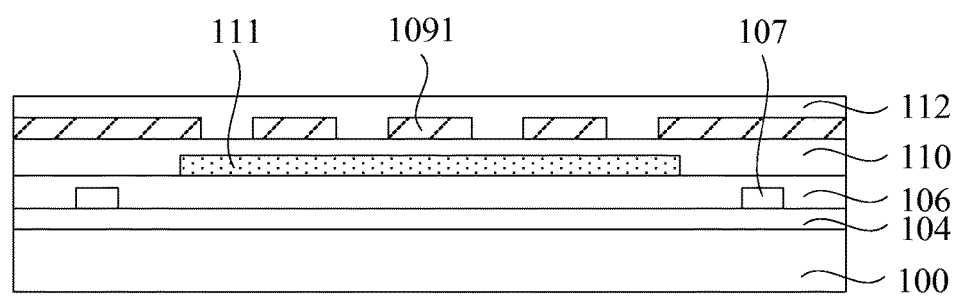
FIG. 4B is a simplified sectional view of the array substrate in FIG. 4A taken along the line DD'.

Reference is made to FIG. 4A and FIG. 4B. FIG. 4A is a schematic top view of an array substrate according to another embodiment of the disclosure, and FIG. 4B is a simplified sectional view of the array substrate in FIG. 4A taken along the line DD'. Referring to FIG. 4A and FIG. 4B, it is can be seen that the structure of the array substrate in the embodiment is similar to the structure of the array substrate in the above embodiments, so emphasis is placed on the difference of the structure from that of the above embodiment with the same part of the structure being briefly described, and the details may refers to FIG. 3A, FIG. 3B and relative descriptions thereof.

Referring to FIG. 4A and FIG. 4B, the array substrate according to the embodiment includes: a substrate 100; multiple scanning lines 105 and multiple data lines 107 which are arranged above the substrate 100, where the multiple scanning lines 105 cross the multiple data lines 107 to define multiple pixel regions; switch elements 103 close to crossings of the scanning lines 105 and the data lines 107; pixel electrodes 111 and common electrodes 109, where the common electrode 109 includes strip-type electrodes 1091 locating in the pixel region and including straight line portions 1091a, and the straight line portions 1091a of the strip-type electrodes 1091 in two pixel regions PA and PB adjacent to each other in an extension direction of the data line 107 are substantially symmetric about an extension direction of the scanning line 105; and an alignment layer 112 arranged above the substrate 100, where the alignment direction OR of the alignment layer 112 is substantially perpendicular to the extension direction of the scanning line 105, and an angle θ between an extension direction of the straight line portion 1091a and the alignment direction OR of the alignment layer 112 is equal to 5.5 degrees.

The array substrate according to the embodiment includes the substrate 100 and a gate metal layer, a first insulating layer 104, a semiconductor layer, a source-drain metal layer, a second insulating layer 106, pixel electrodes 111, a third insulating layer 110, common electrodes 109 and the alignment layer 112 which are arranged on the substrate 100 in sequence.

In the embodiment, the strip-type electrode 1091 further includes corner portions 1091b which are located at two ends of the straight portion 1091a. An angle between the extension direction of the corner portion 1091b and the alignment direction OR of the alignment layer 112 is greater than the angle between the extension direction of the straight line portion 1091a and the alignment direction OR of the alignment layer 112. In the array substrate with this structure, because of arrangement of the corner portions, the electrical fields between the common electrodes 109 and the pixel electrodes 111 at the regions of the corner portions are enhanced, and non-uniformity display at the corner portions is improved. It should be noted that the embodiment is illustrated by taking the case that the corner portions 1091b are located at two ends of the straight line portion 1091a as an example. In other embodiment, the corner portion 1091b may be located at any one end of the straight line portion 1091a, i.e., the strip-type electrode 1091 includes a corner portion 1091b which is located at at least one end of the straight line portion 1091a.

In the embodiment, the common electrode 109 includes three strip-type electrodes 1091. In other embodiment of the disclosure, only the pixel electrode includes multiple strip-type electrodes, or the common electrode and the pixel electrode both include multiple strip-type electrodes, i.e., the pixel electrode and/or the common electrode includes multiple strip-type electrodes. In other embodiment of the disclosure, the number of the strip-type electrodes in each pixel region is preferably in a range between 1 and 4.

Similarly, the case that the angle θ between the extension direction of the straight line portion 1091a and the alignment direction OR of the alignment layer 112 is equal to 5.5 degrees is taken as an example in the embodiment. In other embodiment of the disclosure, θ may be any angle which is greater than or equal to 4 degrees and is less than or equal to 6 degrees, which can improve non-uniformity display of horizontal strips. Preferably, the angle θ between the extension direction of the straight line portion 1091a and the alignment direction OR of the alignment layer 112 is greater than or equal to 4 degrees and is smaller than or equal to 5 degrees, which can improve non-uniformity display of horizontal strips, and further can improve transmittance of a single pixel in the array substrate or the display panel and thus the transmittance of the entire display panel, and reduce the power consumption. Alternatively, the angle θ between the alignment direction OR of the alignment layer 112 and the extension direction of the straight line portion 1091a is greater than or equal to 5 degree and is smaller than or equal to 6 degree, which can improve non-uniformity display of horizontal strips, improve the color deviation and gray scale inversion of the display panel with the array substrate, and increase the viewable angle.

In the array substrate according to the embodiment, the angle between the extension direction of straight line portion 1091a of the strip-type electrode 1091 and the alignment direction OR of the alignment layer 112 is equal to 5.5 degrees, which can improve transmittance discrepancy between two pixel regions adjacent to each other in the extension direction of the data line in a case of alignment deviation, so that the transmittances of two pixel regions adjacent to each other in the extension direction of the data line are substantially equal in the case of alignment deviation, thereby improving non-uniformity display of horizontal strips, improving the color deviation and gray scale inversion of the display panel with the array substrate, and increasing the viewable angle.

Figure 5A:
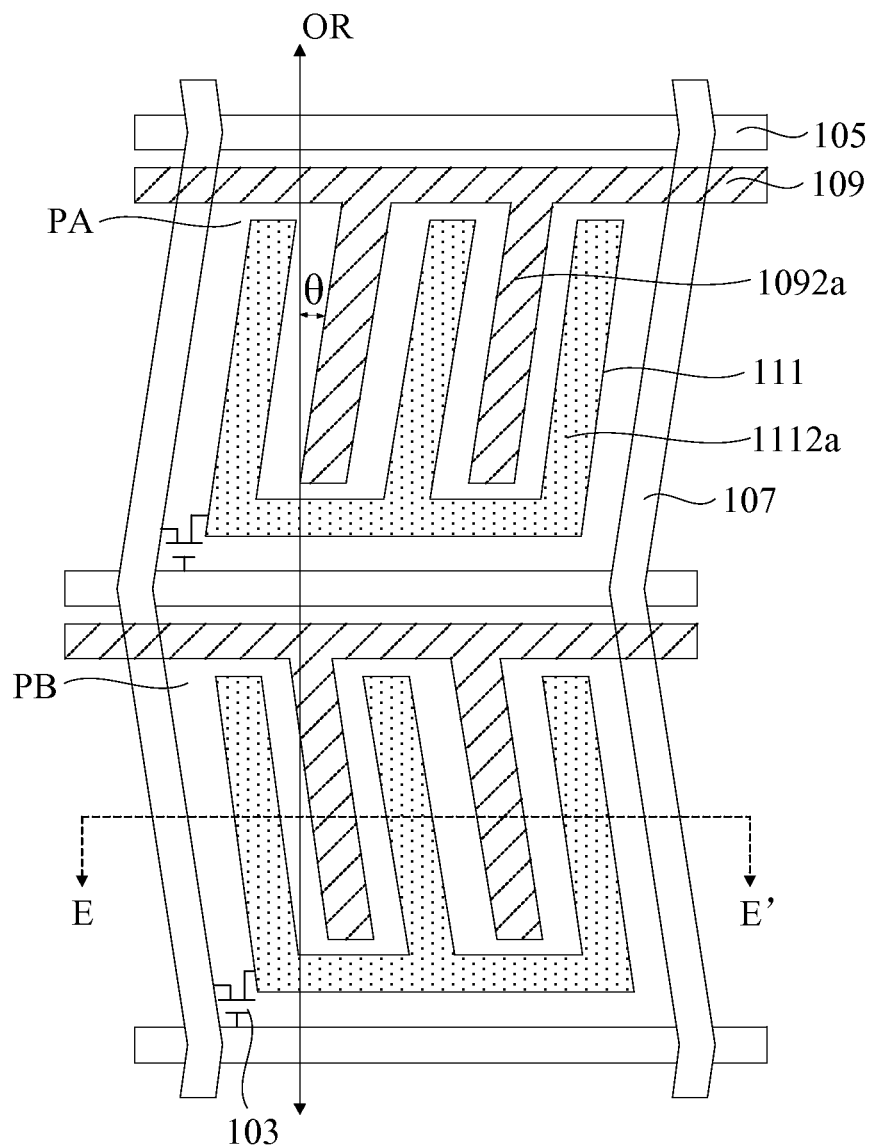
FIG. 5A is a schematic top view of an array substrate according to another embodiment of the disclosure.
Figure 5B:
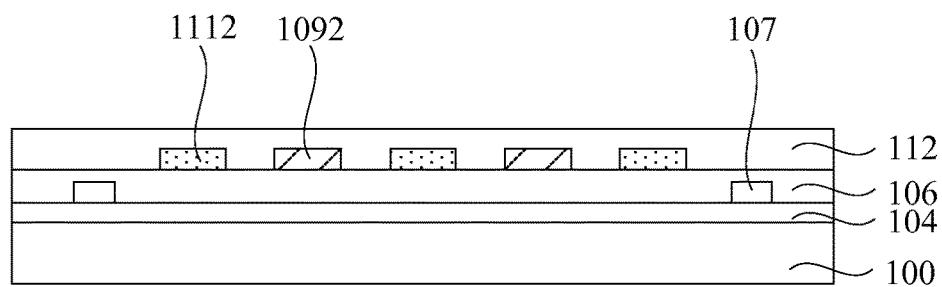
FIG. 5B is a simplified sectional view of the array substrate in FIG. 5A taken along the line EE'.

Reference is made to FIG. 5A and FIG. 5B. FIG. 5A is a schematic top view of an array substrate according to another embodiment of the disclosure, and FIG. 5B is a simplified sectional view of the array substrate in FIG. 5A taken along the line EE'.

Referring to FIG. 5A and FIG. 5B, the array substrate according to the embodiment includes: a substrate 100; multiple scanning lines 105 and multiple data lines 107 which are arranged above the substrate 100, where the scanning lines 105 cross the data lines 107 to define a plurality of pixel regions; switch elements 103 in close proximity to the intersection of the scanning lines 105 and the data lines 107; pixel electrodes 111 and common electrodes 109, where the pixel electrode 111 includes strip-type electrodes, i.e., strip-type pixel electrodes 1112 locating in the pixel region and including pixel straight line portions 1112a, and the common electrode 109 includes strip-type electrodes, i.e., strip-type common electrodes 1092 locating in the pixel region and including common straight line portions 1092a, and the common straight line portions 1092a of the strip-type common electrodes 1092 or the pixel straight line portions 1112a of the strip-type pixel electrodes 1112 in two pixel regions PA and PB adjacent to each other in an extension direction of the data line 107 are substantially symmetric about an extension direction of the scanning line 105; and an alignment layer 112 arranged above the substrate 100, where the alignment direction OR of the alignment layer 112 is substantially perpendicular to the extension direction of the scanning line 105, and an angle θ between the alignment direction OR of the alignment layer 112 and an extension direction of the common straight line portion 1092a or the pixel straight-line portion 1112a is equal to 6 degrees.

Still referring to FIG. 5A and FIG. 5B, the array substrate according to the embodiment includes the substrate 100 and a gate metal layer, a first insulating layer 104, a semiconductor layer, a source-drain metal layer, a second insulating layer 106, a transparent conductive oxide layer and the alignment layer 112 which are arranged on the substrate 100 in sequence. In the embodiment, the semiconductor layer is made of amorphous silicon. In the embodiment, the gate metal layer includes the scanning lines 105 and gates electrically connected to the scanning lines 105, and the source-drain metal layer includes the data lines 107, sources electrically connected to the data lines and drains electrically connected to the pixel electrodes 111. The gate, the semiconductor layer, the source and the drain form the switch element 103 in the embodiment. It should be noted that, the embodiment is illustrated by taking the amorphous silicon as an example, and the semiconductor layer may also be made of polycrystalline silicon or oxide semiconductor in other embodiment of the disclosure.

In the embodiment, the transparent conductive oxide layer includes the pixel electrodes 111 and the common electrodes 109. The pixel electrodes 111 and the common electrodes 109 are comb-shaped and engage with each other. The pixel electrodes 111 and the common electrodes 109 are opposite to each other and insulated from each other, and the pixel electrodes 111 and the common electrodes 109 are located in a same layer. For preparation of the array substrate according to the embodiment, the pixel electrodes 111 and the common electrodes 109 are arranged in a same layer, thus may be prepared in a same process, thereby simplifying process, accelerating production and reducing cost.

Still referring to FIG. 5A and FIG. 5B, in the embodiment, the common electrode 109 includes strip-type common electrodes 1092 and the pixel electrode 111 includes strip-type pixel electrodes 1112. In other embodiment of the disclosure, only the pixel electrode includes multiple strip-type electrodes, or only the common electrode includes multiple strip-type electrodes, i.e., the pixel electrode and/or the common electrode includes strip-type electrodes. FIG. 5A and FIG. 5B are only illustrative, and do not mean to limit the disclosure.

Still referring to FIG. 5A and FIG. 5B, in the embodiment, the strip-type common electrode 1092 includes a common straight line portion 1092a, and the strip-type pixel electrode 1112 includes a pixel straight line portion 1112a. The common straight line portions 1092a of the strip-type common electrodes 1092 or the pixel straight line portions 1112a of the strip-type pixel electrodes 1112 in the two pixel regions adjacent to each other in the extension direction of the data line 107 are substantially symmetric about the extension direction of the scanning lines 105. That is, extension directions of the common straight line portions 1092a of the strip-type common electrodes 1092 or pixel straight line portions 1112a of the strip-type pixel electrodes 1112 in the two pixel regions adjacent to each other in the vertical direction intersect with each other, and the extension direction of the scanning line 105 is in an angular bisector of an angle between corresponding straight line portions of the strip-type electrodes in the two pixel regions adjacent to each other in the vertical direction, i.e., a pseudo double-domain structure is adopted. With the pseudo double-domain structure, transmittances and gray scales of two rows of pixels adjacent to each other in the vertical direction in different visual angles can be compensated, thereby improving viewing angle and gray scale inversion.

Preferably, in the embodiment, the data lines 107 are fold lines. The data lines 107 are parallel to the straight line portions in the pixel region. That is, horizontal distances between the data line 107 and the common straight line portion 1092a of the strip-type common electrode 1092 or the pixel straight line portion 1112a of the strip-type pixel electrode 1112 in the pixel region adjacent to the data line 107 are equal, thereby improving an aperture ratio of the pixel region and thus the transmittance of the display panel in this structure. In other embodiment of the disclosure, the data line may be straight.

The alignment layer 112 is arranged above the substrate 100, and covers other layers on the substrate 100. Referring to FIG. 5A, the alignment direction OR of the alignment layer 112 is substantially perpendicular to the extension direction of the scanning lines 105, i.e., the alignment direction OR of the alignment layer extends along the vertical direction. The angle θ between the extension direction of the straight line portion (the common straight line portion 1092a or the pixel straight line portion 1112a) and the alignment direction OR of the alignment layer 112 is equal to 6 degree, which can improve transmittance discrepancy between two pixel regions adjacent to each other in the extension direction of the data line for the array substrate in a case of alignment deviation, so that the transmittances of two pixel regions adjacent to each other in the extension direction of the data line are substantially equal in the case of alignment deviation, thereby improving non-uniformity display of horizontal strips.

It should be noted that the case that the angle θ between the extension direction of the straight line portion and the alignment direction OR of the alignment layer 112 is equal to 6 degree is taken as an example in the embodiment. In other embodiment of the disclosure, θ may be any angle which is greater than or equal to 4 degree and is smaller than or equal to 6 degree, which can improve non-uniformity display of horizontal strips. Preferably, the angle θ between the extension direction of the straight line portion and the alignment direction OR of the alignment layer 112 is greater than or equal to 4 degree and is smaller than or equal to 5 degree, which can improve non-uniformity display of horizontal strips, and further can improve transmittance of a single pixel in the array substrate or the display panel and thus the transmittance of the entire display panel, and reduce the power consumption. Alternatively, the angle θ between the alignment direction OR of the alignment layer 112 and the extension direction of the straight line portion is greater than or equal to 5 degree and is smaller than or equal to 6 degree, which can improve non-uniformity display of horizontal strips, improve the color deviation and gray scale inversion of the display panel with the array substrate, and increase the viewable angle.

In the array substrate according to the embodiment, the angle between the extension direction of the common straight line portion 1092a or the pixel straight line portion 1112a and the alignment direction OR of the alignment layer 112 is equal to 6 degree, which can improve transmittance discrepancy between two pixel regions adjacent to each other in the extension direction of the data line in a case of alignment deviation, so that the transmittances of two pixel regions adjacent to each other in the extension direction of the data line are substantially equal in the case of alignment deviation, thereby improving non-uniformity display of horizontal strips, improving the color deviation and gray scale inversion of the display panel with the array substrate, and increasing the viewable angle.

It should be noted that in other embodiment of the disclosure, the strip-type common electrode 1092 and/or the strip-type pixel electrode 1112 includes a corner portion locating at at least one end of the common straight line portion 1092a and/or the pixel straight line portion 1112a. Similarly to the structure of the corner portion in the array substrate according to other embodiment of the disclosure, the electric field between the pixel electrode 111 and the common electrode 109 at the region of the corner portion is enhanced, and non-uniformity display at the corner portion is improved.

Figure 6:
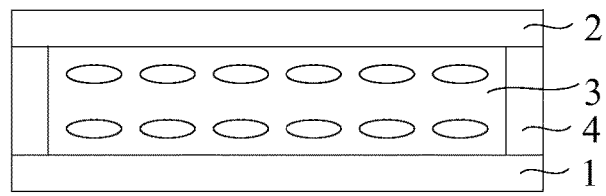
FIG. 6 is a schematic structural diagram of a liquid crystal display panel according to an embodiment of the disclosure.

FIG. 6 is a schematic structural diagram of a liquid crystal display panel according to an embodiment of the disclosure. As shown in FIG. 6, the liquid crystal display panel according to the embodiment includes an array substrate 1, a color film substrate 2 arranged opposite to the array substrate 1, and a liquid crystal layer 3 between the array substrate 1 and the color film substrate 2. The array substrate 1 and the color film substrate 2 are aligned and adhered through sealing glue 4.

The array substrate 1 may be the array substrate in any one of the above embodiments. The array substrate includes:

a substrate; multiple scanning lines and multiple data lines which are arranged above the substrate, where the multiple scanning lines cross the multiple data lines to define multiple pixel regions; switch elements close to crossings of the scanning lines and the data lines; pixel electrodes and common electrodes, where the pixel electrode and/or the common electrode includes a strip-type electrode locating in the pixel region and including a straight line portion; and the straight line portions of the strip-type electrodes in two pixel regions adjacent to each other in an extension direction of the data line are substantially symmetric about an extension direction of the scanning line; and an alignment layer arranged above the substrate, where the alignment direction of the alignment layer is substantially perpendicular to the extension direction of the scanning line, and an angle between an extension direction of the straight line portion and the alignment direction of the alignment layer is greater than or equal to 4 degrees and is less than or equal to 6 degrees.

The liquid crystal display panel according to the embodiment of the disclosure, the angle between the extension direction of the straight line portion of the strip-type electrode of the array substrate and the alignment direction of the alignment layer is greater than or equal to 4 degree and is smaller than or equal to 6 degree, which can improve transmittance discrepancy between two pixel regions adjacent to each other in the extension direction of the data line in a case of alignment deviation, so that the transmittances of two pixel regions adjacent to each other in the extension direction of the data line are substantially equal in the case of alignment deviation, thereby improving non-uniformity display of horizontal strips.

Detail description of the disclosure is made above in conjunction with preferred embodiments, which does not mean to limit the disclosure. Some modifications and improvements within the principle of the disclosure may be made by those with ordinary skill in the art, and these modifications and improvements fall within the scope of the invention.

What is claimed is:

1. An array substrate, comprising:
   a substrate;
   a plurality of scanning lines and a plurality of data lines arranged above the substrate, wherein the plurality of scanning lines intercepts the plurality of data lines to define a plurality of pixel regions;
   a plurality of switch elements each disposed in close proximity to an intersection of one of the scanning lines and one of the data lines, wherein each of the plurality of switch elements comprises a gate electrode, a semiconductor layer, a source electrode and a drain electrode;
   a plurality of pixel electrodes and a plurality of common electrodes, wherein each of the plurality of pixel electrodes comprises strip-type electrodes and two connecting end portions, wherein each of the connecting end portions is substantially parallel to the plurality of scanning lines, and
   wherein the strip-type electrodes each includes three portions: a first straight-line portion connecting to a second straight-line portion on one end and a third straight-line portion on another end, wherein the second straight-line portion and the third straight-line portion are parallel to each other; and
   wherein each of the plurality of common electrodes is a planar electrode covering the scanning lines and the data lines between two adjacent pixel regions and has an opening exposing the switch elements in each said pixel region including the gate electrode, the semiconductor layer, the source electrode and the drain electrode;
   a source-drain metal layer patterned on the substrate;
   a planarization layer disposed on the source-drain metal layer;
   a pixel electrode layer comprising the plurality of pixel electrodes patterned on the planarization layer;
   a common electrode layer comprising the plurality of common electrodes patterned on the planarization layer; and
   an alignment layer patterned above the common electrode, having an alignment direction substantially perpendicular to a scanning line direction;
   wherein a first angle between a direction of the first straight-line portion and the alignment direction is in a range of 4 to 6 degrees, and wherein a second angle between a direction of the second straight-line portion and the third straight-line portion and the alignment direction is larger than the first angle; and
   wherein the strip-type electrodes in two adjacent pixel regions at opposite sides of a scanning line are substantially symmetric.

2. A liquid crystal display panel, comprising:
   an array substrate, a color film substrate arranged opposite to the array substrate, and a liquid crystal layer between the array substrate and the color film substrate, wherein the array substrate comprises:
   a substrate;
   a plurality of scanning lines and a plurality of data lines arranged above the substrate, wherein the plurality of scanning lines intercepts the plurality of data lines defining a plurality of pixel regions;
   a plurality of switch elements each disposed in close proximity to an intersection of one of the scanning lines and one of the data lines, wherein each of the plurality of switch elements comprises a gate electrode, a semiconductor layer, a source electrode and a drain electrode;
   a plurality of pixel electrodes and a plurality of common electrodes, wherein each of the plurality of pixel electrodes comprises strip-type electrodes and two connecting end portions, wherein each of the connecting end portions is substantially parallel to the plurality of scanning lines, and
   wherein the strip-type electrodes each includes three portions: a first straight-line portion connecting to a second straight-line portion on one end and a third straight-line portion on another end, wherein the second straight-line portion and the third straight-line portion are parallel to each other; and
   wherein each of the plurality of common electrodes is a planar electrode covering the scanning lines and the data lines between two adjacent pixel regions and has an opening exposing the switch elements in each said pixel region including the gate electrode, the semiconductor layer, the source electrode and the drain electrode;
   a source-drain metal layer patterned on the substrate;
   a planarization layer disposed on the source-drain metal layer;
   a pixel electrode layer comprising the plurality of pixel electrodes patterned on the planarization layer;

a common electrode layer comprising the plurality of common electrodes patterned on the planarization layer; and an alignment layer patterned above the common electrode, having an alignment direction substantially perpendicular to a scanning line direction;

wherein a first angle between a direction of the first straight-line portion and the alignment direction is in a range of 4 to 6 degrees, and wherein a second angle between a direction of the second straight-line portion and the third straight-line portion and the alignment direction is larger than the first angle; and wherein the strip-type electrodes in two adjacent pixel regions at opposite sides of a scanning line are substantially symmetric.

3. The array substrate according to claim 1, wherein the first angle is in a range of 4 to 5 degrees.

4. The array substrate according to claim 1, wherein the first angle is in a range of 5 to 6 degrees.

5. The array substrate according to claim 1, wherein a number of the strip-type electrodes in each pixel region is in a range of 1 to 4.

6. The array substrate according to claim 1, further comprising an insulating layer arranged between the common electrodes and the pixel electrodes.

7. The array substrate according to claim 1, further comprising an insulating layer separating the plurality of pixel electrodes from the plurality of common electrodes, wherein the pixel electrode layer and the common electrode layer are patterned as a same layer.

8. The array substrate according to claim 1, wherein the first straight-line portion of each pixel electrode is parallel to one of the directions of each data line.

9. The liquid crystal display panel according to claim 2, wherein the first angle is in the range of 4 to 5 degrees.

10. The liquid crystal display panel according to claim 2, wherein the first angle is 5 to 6 degrees.

11. The liquid crystal display panel according to claim 2, wherein a number of the strip-type electrodes in each pixel region is in a range of 1 to 4.

12. The liquid crystal display panel according to claim 2, further comprising an insulating layer arranged between the common electrodes and the pixel electrodes.

13. The liquid crystal display panel according to claim 2, further comprising an insulating layer separating the plurality of pixel electrodes from the plurality of common electrodes, wherein the pixel electrode layer and the common electrode layer are patterned as a same layer.

14. The liquid crystal display panel according to claim 2, wherein the first straight-line portion of each pixel electrode is parallel to one of the directions of each data line.

* * * * *